(12) United States Patent
Rockelmann et al.

(10) Patent No.: US 12,246,515 B2
(45) Date of Patent: Mar. 11, 2025

(54) GLAZING DEVICE FOR A VEHICLE AND VEHICLE HAVING SUCH A GLAZING DEVICE

(71) Applicant: Webasto SE, Stockdorf (DE)

(72) Inventors: Andreas Rockelmann, Stockdorf (DE); Philip Ertle, Stockdorf (DE); Tobias Mech, Stockdorf (DE); Georg Rossmair, Stockdorf (DE); Yannick Theis, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/654,630

(22) Filed: May 3, 2024

(65) Prior Publication Data
US 2024/0375377 A1 Nov. 14, 2024

(30) Foreign Application Priority Data
May 8, 2023 (DE) ...................... 10 2023 111 997.4

(51) Int. Cl.
 *B32B 17/10* (2006.01)
 *B60J 1/20* (2006.01)
 (Continued)

(52) U.S. Cl.
 CPC .. *B32B 17/10541* (2013.01); *B32B 17/10036* (2013.01); *B32B 17/1077* (2013.01);
 (Continued)

(58) Field of Classification Search
 CPC ........ B32B 17/10541; B32B 17/10036; B60Q 3/208; B60Q 3/51; B60J 1/2066; B62D 25/06; F21V 19/003
 See application file for complete search history.

(56) References Cited

U.S. PATENT DOCUMENTS

2012/0320621 A1* 12/2012 Kleo ................... B32B 17/1066
 362/558
2014/0362597 A1* 12/2014 Verrat-Debailleul .... B60Q 3/62
 362/511
(Continued)

FOREIGN PATENT DOCUMENTS

| DE | 10204359 A1 | 10/2002 |
|---|---|---|
| DE | 102014100838 A1 | 7/2015 |
| DE | 102022103129 A1 | 8/2023 |

OTHER PUBLICATIONS

Office Action issued against corresponding German Application No. 10 2023 111 997.4; mailed Jan. 24, 2024; In German with English Machine Translation ( 12 pages).

*Primary Examiner* — Christopher E Dunay
(74) *Attorney, Agent, or Firm* — Fitch, Even Tabin & Flannery LLP (57) ABSTRACT

A glazing device for a vehicle has an illuminated glazing unit and has a flat outer glass element at least partly forming or continuing the outer body skin and a flat inner glass element. A one-piece or multipart elongated carrier profile component is arranged on an edge section of the inner glass element and holds a lighting device such that the lighting device couples light laterally into the inner glass element. The carrier profile component is attached to the inner glass element and/or the outer glass element, and/or the outer glass element covers the inner glass element or projects laterally beyond the inner glass element in such a way that an edge section of the outer glass element can be attached to a vehicle roof frame and is spaced apart from the edge section of the inner glass element.

17 Claims, 9 Drawing Sheets

(51) Int. Cl.
  *B60Q 3/208*   (2017.01)
  *B60Q 3/51*    (2017.01)
  *B62D 25/06*   (2006.01)
  *F21V 19/00*   (2006.01)
  *F21Y 113/00*  (2016.01)
  *F21Y 115/10*  (2016.01)

(52) U.S. Cl.
  CPC ............ *B60J 1/2066* (2013.01); *B60Q 3/208* (2017.02); *B60Q 3/51* (2017.02); *B62D 25/06* (2013.01); *F21V 19/003* (2013.01); *B32B 2605/08* (2013.01); *B32B 2605/10* (2013.01); *F21Y 2113/00* (2013.01); *F21Y 2115/10* (2016.08)

(56) References Cited

U.S. PATENT DOCUMENTS

| | | |
|---|---|---|
| 2015/0210040 A1 | 7/2015 | Böhm |
| 2015/0247968 A1* | 9/2015 | Verrat-Debailleul .................... G02B 6/0076 362/612 |
| 2015/0370140 A1* | 12/2015 | Bertolini .................. B60J 3/04 359/275 |
| 2018/0086028 A1* | 3/2018 | Berard .................. B60Q 1/268 |
| 2019/0176690 A1* | 6/2019 | Park .................. B60Q 3/208 |

\* cited by examiner

GLAZING DEVICE FOR A VEHICLE AND VEHICLE HAVING SUCH A GLAZING DEVICE

CROSS-REFERENCE TO RELATED APPLICATION(S)

This application claims the benefit of German Patent application 10 2023 111 997.4 filed May 8, 2023, which is incorporated herein by reference in its entirety.

TECHNICAL FIELD

The invention relates to a glazing device for a vehicle, in particular for a motor or rail vehicle, having an illuminated glazing unit, by which an opening in an outer body skin of the vehicle is at least partly closed. The glazing unit has a flat outer glass element at least partly forming or continuing the outer body skin, and a flat inner glass element arranged on the inside at a predetermined distance from the outer glass element.

Furthermore, the invention also relates to a vehicle having such a glazing device.

BACKGROUND

Conventionally, such glazing devices are used, for example, in conjunction with motor vehicles, for example in the form of stationary glass roofs, sliding glass roofs, panoramic glass roofs and so on. Such glass roofs in motor vehicles have to fulfill an extremely wide range of functions and requirements. For example, in addition to a desired appropriate esthetic, the glass roof is primarily also intended to permit a certain level of light transmission in order to allow daylight into the vehicle interior. Preferably, however, this light transmission is to be variably adjustable, for example by using conventional roller blinds or even by using costly so-called smart glass (intelligent glass), the light transmission of which can be changed by applying an electrical voltage, by changed light conditions or by heating. In addition, in the case of sliding glass roofs, a ventilation function is additionally also to be served.

A further function of glass roofs is also an insulation function. For example, some glass roofs are coated with specific materials in order to screen off UV rays, in particular to let them through partly or to reflect them entirely and thus to insulate the interior from heat and cold.

Primarily, however, such glass roofs must also meet requirements on safety, for which reason conventional glass roofs are generally made of safety glass.

SUMMARY

To fulfill the aforementioned functions, to some extent additional components are required. For example, roller blinds for the variable adjustment of the light transmission require additional installation space. If the glass roofs are a multi-pane system such as two-pane systems with external safety glass for fulfilling the safety function, according to the prior art an increased installation space is required in the vehicle vertical direction (z direction of the conventional vehicle coordinate system) if a roller blind system is additionally provided, in particular when the glass roof, in addition to a roller blind system, is also intended to have so-called ambient light equipment, in which the glazing of the glass roof is additionally intended to be illuminated as needed in order to achieve specific ambient illumination in the vehicle interior.

The invention is therefore based on the object of developing the glazing devices known from the prior art in such a way that the aforementioned disadvantages can at least partly be overcome; preferably, it is an object of the invention to provide a glazing device and a vehicle having such a glazing device which is able to fulfill as many as possible of the aforementioned functions with compact installation space requirements.

This object is achieved by a glazing device having the features of the independent claim. Advantageous refinements and developments of the invention emerge from the dependent claims.

The glazing device according to the invention is intended for a vehicle, in particular for a motor or rail vehicle, and comprises an illuminated glazing unit, by which an opening in an outer body skin of the vehicle is at least partly closed. The glazing unit has a flat outer glass element at least partly forming or continuing the outer body skin, and a flat inner glass element arranged on the inside at a predetermined distance from the outer glass element, wherein a one-piece or multipart elongated carrier profile component is arranged on an edge section of the inner glass element and holds a lighting device such that the lighting device couples light laterally into the inner glass element, wherein the carrier profile component is attached exclusively to the inner glass element or the outer glass element, or is attached both to the inner glass element and to the outer glass element, and/or the outer glass element covers the inner glass element or projects laterally beyond the inner glass element in such a way that an edge section of the outer glass element can be attached to a vehicle roof frame and is spaced apart from the edge section of the inner glass element. The fact that the carrier profile component is arranged on the edge section of the inner glass element and holds the lighting device, the edge section of the inner glass element optionally being spaced apart from that of the outer glass element, means that a compact glazing unit having an extremely wide range of envisioned functions can be made available. The inner glass element and the outer glass element constitute a two-pane system which, when safety glass is used as the outer glass element, fulfills requirements on safety. While the lighting device is arranged at the side of the inner glass element, in particular on both sides of the two opposite longitudinal edges of the inner glass element, in order to couple light into the inner glass element and ultimately to lead it into the vehicle interior via the inner glass element, the further requirement relating to the regulation of the light transmission can be fulfilled. For example, an unchangeable light transmission can be achieved by shading being incorporated into the glass surface (i.e. so-called SIG ("Shading in Glass")). Alternatively, a roller blind system or a roller blind device can also be provided, this advantageously being set up in the glass intermediate space, which benefits the compactness of the glazing device. A roller blind web or a roller blind material thus experiences no sagging, since it can rest on the inner glass element, thus the lower pane of the two-pane system. Via a roller blind device, the light transmission is thus variably adjustable, wherein virtually complete shading may be feasible, given an appropriate selection of the roller blind material. In addition, as compared with classic single-pane glazing, the double glazing or the two-pane system has advantages with regard to sound dampening or sound insulation and with regard to thermal insulation.

The fact that the outer glass element projects laterally beyond the inner glass element in such a way that an edge section of the outer glass element can be attached to a vehicle roof frame and is spaced apart from the edge section of the inner glass element means that installation space is made available for different functional units in the area of the inner glass element, which is beneficial to the compactness of the glazing device.

The glazing device according to the invention can advantageously be developed such that the carrier profile component is at least partly designed as a holder for a fixed roof lining or a displaceable sliding roof lining or an inner lining of the vehicle and is configured to hold the fixed roof lining or the displaceable sliding roof lining or the inner lining, at least in some sections. For example, the carrier profile component can be used as a type of suspension for the lateral fixed roof lining or a lateral inner lining of the vehicle, which lines at least lateral sections of the vehicle interior.

Furthermore, the glazing device according to the invention can be implemented in such a way that the carrier profile component comprises a first profile and a second profile, wherein the first profile is attached to the inner glass element and forms the holder for the fixed roof lining or the displaceable sliding roof lining or the inner lining, while the second profile is connected to the first profile by a form fit and/or force fit and holds the lighting device laterally on the edge section of the inner glass element. Like the carrier profile component, the first and second profile are also elongated profiles with open cross sections, which can be plugged into one another or joined to one another in such a way that these form the form-fitting and/or force-fitting connection.

Moreover, the glazing device according to the invention can be embodied such that the second profile is formed with at least two profile legs, on one freestanding profile leg of which the lighting device is held, and of which the other profile leg is connected to the first profile. The freestanding profile leg is thus expediently used to hold the lighting device, while the other profile leg is exclusively and directly connected to the first profile.

Moreover, the glazing device according to the invention can be formed in such a way that the form-fitting and/or force-fitting connection of the second profile to the first profile is a preferably nondestructively detachable plug-in connection or latching connection.

Further, the glazing device according to the invention can be implemented such that one profile leg of the second profile is connected by a form fit and/or force fit to a supporting section attached to the outer glass element on the inner side and spaced apart from the edge section of the outer glass element, preferably in the form of an injection molded element, and its other profile leg is connected to the first profile. In a corresponding way, the second profile holds the lighting device on a profile web that is formed between the two profile legs and connects the two profile legs to each other.

Furthermore, the glazing device according to the invention can be implemented in such a way that the connection of the second profile to the first profile and the supporting section is a clamped connection. The profile legs of the second profile are preferably attached to the supporting section and to the first profile by a force fit and/or form fit such that a clamped fit is produced, on the basis of which the second profile is held.

In addition, the glazing device according to the invention can be developed such that the outer glass element and the inner glass element form multipane insulating glass, so that a cavity formed between the outer glass element and the inner glass element is closed in a fluid-tight manner, wherein a vacuum or a positive pressure preferably prevails in the cavity.

Furthermore, the glazing device according to the invention can be implemented in such a way that the outer glass element and the inner glass element are held at a distance from each other via one or more spacers to form the cavity and/or the cavity is sealed off in a fluid-tight manner via a seal element, which is preferably designed in the form of a PU injection molded element and/or is formed by the supporting section.

Otherwise, the glazing device according to the invention can be implemented in such a way that a roller blind device, via which the transparency or light transmission of the glazing element can be regulated by means of a roller blind web, is arranged between the outer glass element and the inner glass element.

In addition, the glazing device according to the invention can be implemented in such a way that the carrier profile component holds the lighting device in the form of one or more side LEDs or one or more top LEDs, in such a way that light from the lighting device can be coupled laterally into the inner glass element, in particular into a lateral incident surface of the inner glass element. Depending on the design of the lighting device, for example in the form of a side LED or top LED, different alignments of the printed circuit board (PCB) in relation to the inner glass element may be feasible. The fact that the second profile can easily be detached means that the lighting device and the printed circuit board are easily replaceable, for example in the event of a repair.

Furthermore, the glazing device according to the invention can be developed in such a way that the lighting device is formed by one or more side LEDs, which is/are contacted by one or more printed circuit boards, which is/are arranged substantially parallel to the inner glass element, or is formed by one or more top LEDs, which is/are contacted by one or more printed circuit boards, which is/are arranged substantially perpendicular to the inner glass element, wherein the one or more printed circuit boards is/are preferably held by the second profile in the form of a bezel or covering.

Moreover, the glazing device according to the invention can be configured in such a way that the outer glass element and/or the inner glass element are formed by single-pane safety glass (ESG) or composite safely glass (VSG). Preferably, the inner glass element is designed as a thin glass laminate, preferably having the following structure: tinted pane adjacent to the pane interspace, PVB laminate film, a clear glass pane for ambient light directed toward the vehicle interior.

The result is a low weight and an economic solution, but the safety glass function can nevertheless be fulfilled. In addition, different tints and antireflective coating are feasible.

A transparent print can be provided on the inner glass element, but alternatively also an aforementioned PVB film (polyvinyl butyral film) can also be used. For example, the transparent print can have reflective or light output structures which reflect light coupled into the inner glass element and conduct it into the vehicle interior or couple light out of the inner glass element in the direction of the vehicle interior.

By using the transparent print, a certain freedom of design is achieved. The print can be made, for example, on the inside on the clear glass side of the inner glass element or on the PVB film in an extremely wide range of designs. The transparent print is protected in the laminate, an imprint on the clear glass pane or PVB film being feasible.

The roller blind web or the roller blind material of the roller blind device preferably runs on the inner side of the thin glass composite. As a result, the transparent print is protected against abrasion.

Alternatively, the inner glass element or the inner pane can be formed by single-pane safety glass (ESG), which can also be printed. The PVB film can additionally be used as a splinter guard. Glass thicknesses or glass composite thicknesses having, for example, 1.4 mm/1.1 mm glasses and an overall thickness with film of 3.26 mm are feasible.

As a result, a thinner, more economical composite is feasible.

Furthermore, the glazing device according to the invention can be implemented in such a way that the carrier profile component forms a covering which covers the lighting device in the lateral area of the inner glass element.

The vehicle according to the invention is in particular a motor or rail vehicle and comprises a vehicle roof having an opening, which is at least partly closed by the glazing device according to the invention.

As a result, the properties and advantages explained in connection with the glazing device according to the invention result in the same or similar way, for which reason reference is made to the above explanations with regard to the glazing device according to the invention to avoid repetitions.

BRIEF DESCRIPTION OF DRAWINGS

Preferred embodiments of the invention are explained by way of example below by using the figures, in which.

DETAILED DESCRIPTION

Figure 1A:
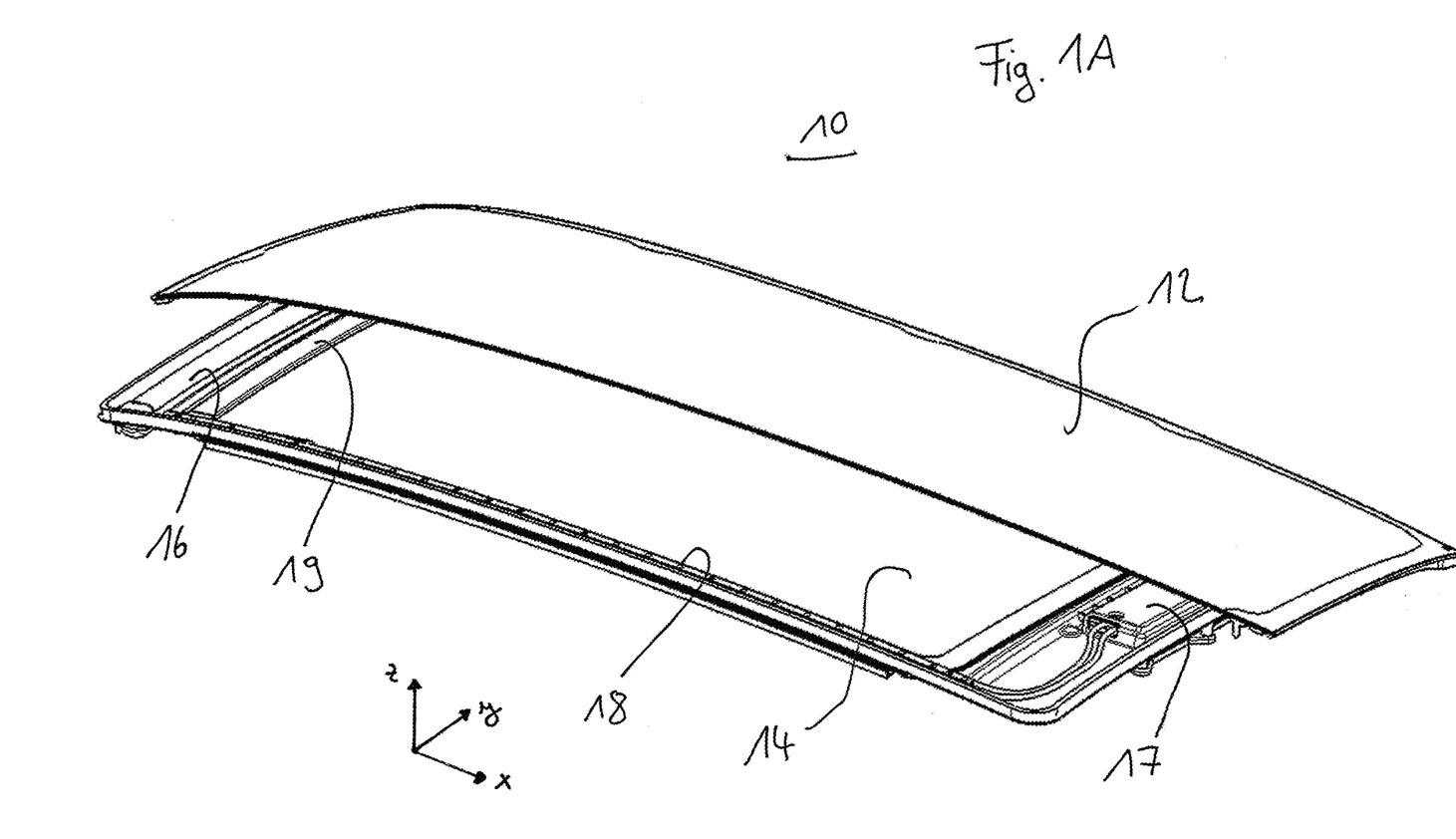
FIG. 1A shows a schematic illustration of a glazing device according to the invention in a perspective view.
Figure 1B:
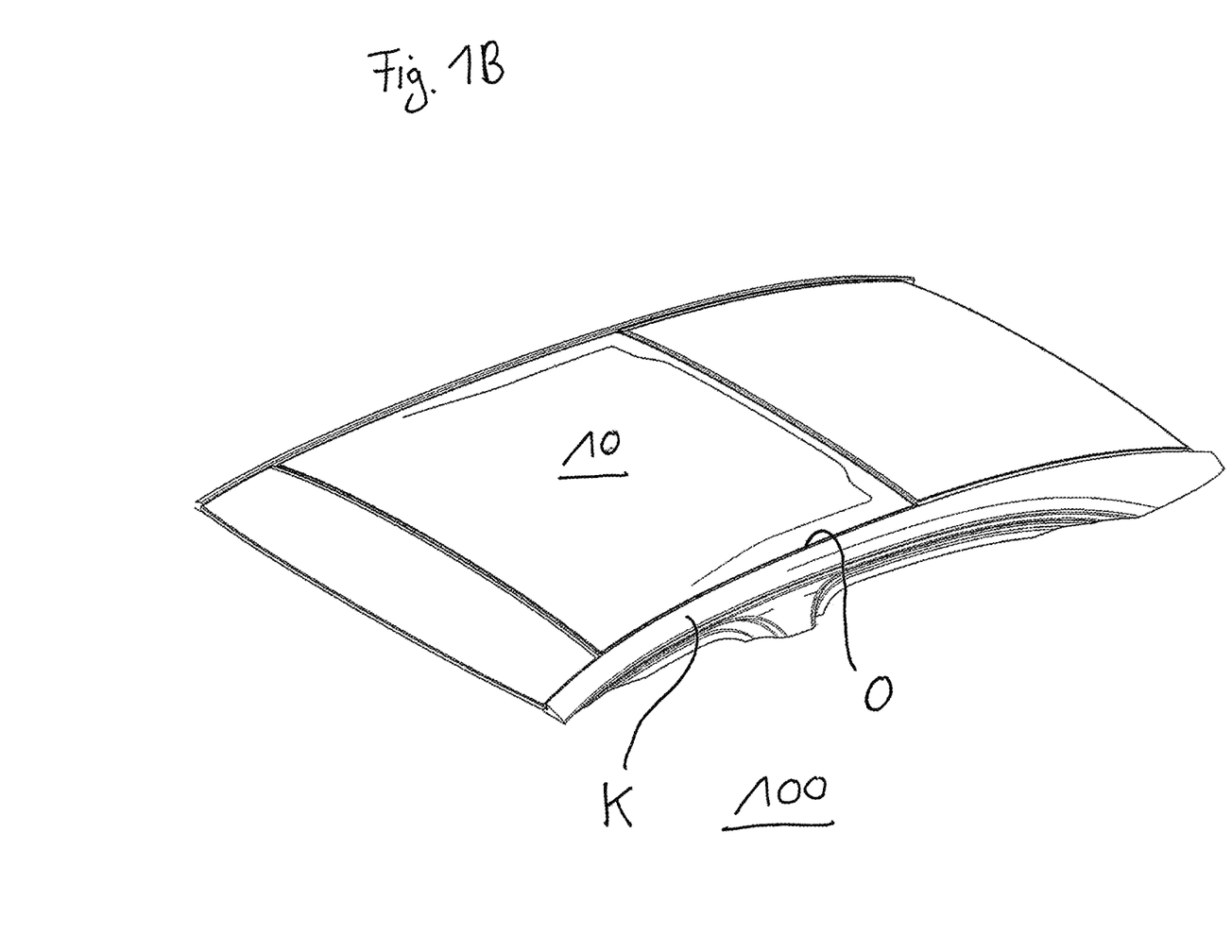
FIG. 1B shows a schematic illustration in a perspective view of a vehicle roof, in which the glazing device according to the invention is provided.

FIG. 1A shows a schematic illustration of a glazing device 10 according to the invention in a perspective view from above. In this case, the glazing device 10 according to the invention is intended for a vehicle according to the invention, in particular a motor vehicle, 100 and comprises an illuminated glazing unit 12, 14, by means of which an opening O in an outer body skin K or in a vehicle roof of the vehicle 100 is closed, as illustrated in FIG. 1B.

As can further be seen in FIG. 1A, the glazing unit 12, 14 has a flat outer glass element 12 at least partly forming or continuing the outer body skin K, which forms an outer glass pane, and a flat inner glass element 14 arranged on the inside at a predetermined distance, in particular in the z direction corresponding to the conventional vehicle coordinate system, from the outer glass element 12, which forms an inner glass pane. In FIG. 1A, the outer glass element 12 is illustrated only partly, in order to be able to indicate elements and components located underneath or located further in.

Besides the inner glass element 14 arranged underneath the outer glass element 12, a conventional roller blind device 16, 17, 18, 19, which is arranged between the outer glass element 12 and the inner glass element 14, is also shown in FIG. 1A.

In the case illustrated, the roller blind device 16, 17, 18, 19 comprises at least one winding shaft 16, on which a roller blind web can be wound and unwound, wherein the roller blind web is also connected to a tension rod 19 at one end. Via the tension rod 19, which, at its two ends, is guided so as to be movable translationally, for example on a frame, the roller blind web can thus be extended and accordingly unwound from the winding shaft 16 by the tension rod 19 being moved over the area to be covered. The roller blind web is extended by means of a drive 17, for example an electric drive such as an electric motor, which is connected to the two ends of the tension rod via a pull cable guided in a roller blind cable guide 18. The roller blind web is wound up in an opposite movement onto the winding shaft 16 spring-preloaded in the winding direction. Thus, the transparency of the glazing unit 12, 14 can be regulated appropriately by the extension and retraction of the roller blind web. In the case illustrated, the roller blind device 16, 17, 18, 19 is thus located between the inner glass element 14 and the outer glass element 12.

Figure 2:
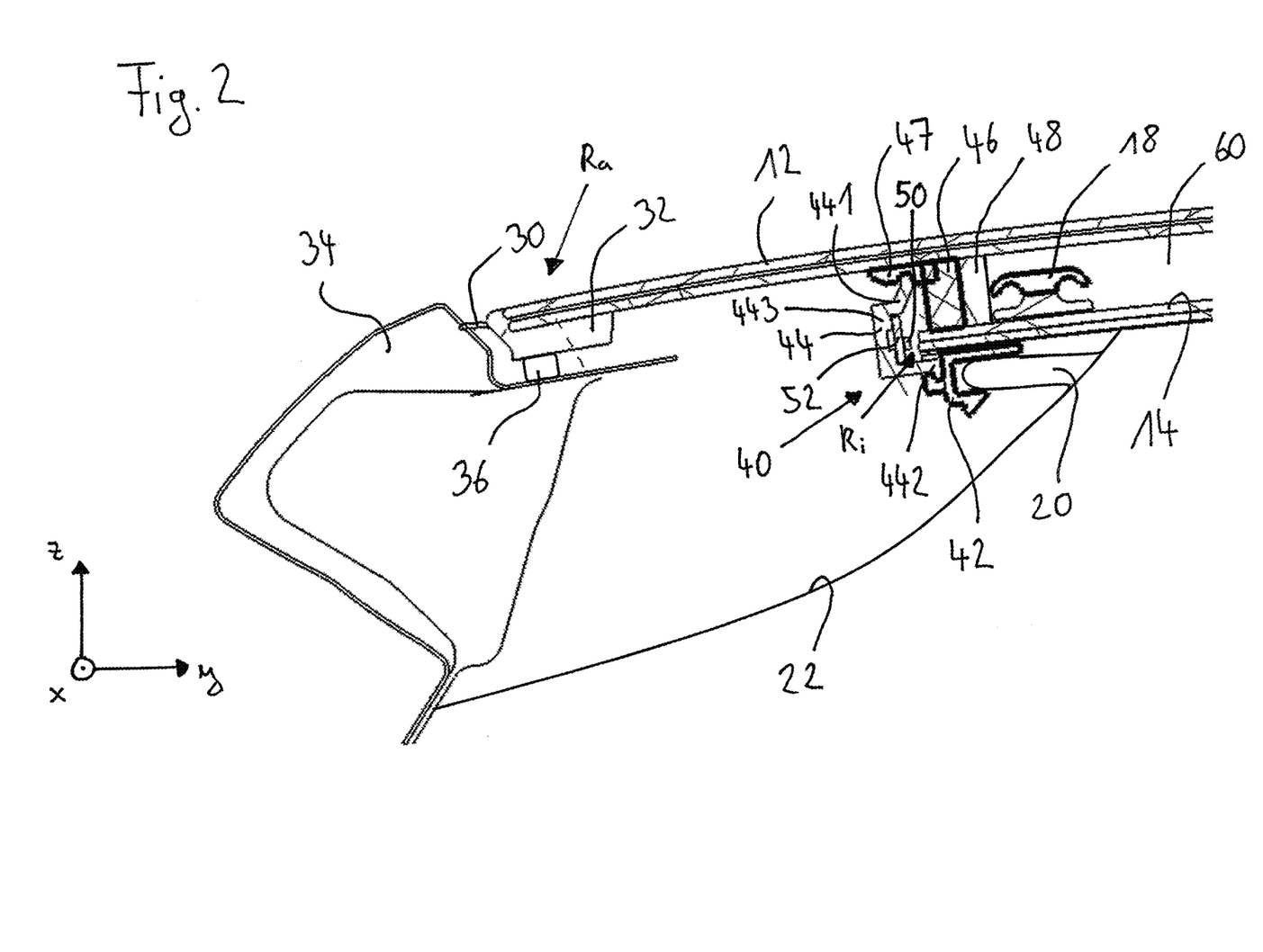
FIG. 2 shows a schematic partial illustration of the glazing device according to the invention from FIG. 1 in a cross section in the vehicle transverse direction.

FIG. 2 further shows a schematic partial illustration of the glazing device 10 according to the invention from FIG. 1 in a cross section in the vehicle transverse direction. As can be seen in FIG. 2, in this case the glazing device 10 according to the invention also comprises a multipart elongated carrier profile component 40 in cross section, which in FIG. 2 has the elements 42, 44 and corresponds to the embodiment of FIG. 8, which will be discussed below.

The specific structure of the carrier profile component 40 will be discussed in more detail below in connection with the arrangement of the inner and outer glass elements 12, 14, during the description of the respective embodiments.

In any case, the multipart elongated carrier profile component 40 is arranged on an edge section Ri of the inner glass element 14 and there holds a lighting device 50 such that the lighting device 50 couples light laterally into the inner glass element 14. For this purpose, the carrier profile component 40 is formed at least partly as a covering which covers the lighting device 50 in the lateral area of the inner glass element 14. In particular, light from the lighting device 50 is coupled into a side surface of the inner glass element 14, so that the light coupled in is led over the inner glass element 14 and a print applied to the latter into a vehicle interior of the vehicle 100.

In the case illustrated, the carrier profile component 40 fulfills an additional function. In particular, the carrier profile component 40 is formed as a holder for a fixed roof lining 22 of the motor vehicle 100. This holder is implemented by the carrier profile component 40 being configured to hold the fixed roof lining 22, for example by means of a plug-in connection or latching connection or an appropriate suspension 20.

The outer glass element 12 and the inner glass element 14 form multipane insulating glass (MIG) such that a cavity 60 formed between the outer glass element 12 and the inner glass element 14 is closed in a fluid-tight manner. This is achieved, for example, by a seal described in more detail below running around the edge regions of the outer glass element 12 and the inner glass element 14, so that, amongst other things, there can be a vacuum or a positive pressure in the cavity 60.

As can also be seen in FIG. 2, the outer glass element 12 covers the inner glass element 14 or projects laterally beyond the inner glass element 14 by a predefined distance in the vehicle transverse direction or y direction of the conventional vehicle coordinate system, see FIGS. 1 and 2. As a result, an edge section Ra of the outer glass element 12 is thus spaced apart from an edge section Ri of the inner glass element 14 in the vehicle transverse direction or y direction. This makes it possible for an edge section Ra of the outer glass element 12 of the glazing unit 14, 16 to be attached to a vehicle roof frame 34, while the functional units such as the roller blind device 16-19, the holder 20 for the roof lining 22 and the holder of the lighting device 50 are arranged in the area of the inner glass element 14.

For example, on the edge section Ra of the outer glass element 12 there is formed a plastic foaming or overmolding 32, which is fastened via an adhesive bond 36 to a flange of the vehicle roof frame 34, if necessary also additionally screwed. To seal off a joint or gap formed between the outer glass element 12 and the vehicle roof frame 34, a seal or sealing lip 30 is molded onto or fastened to the plastic foaming or overmolding 32.

Figure 3:
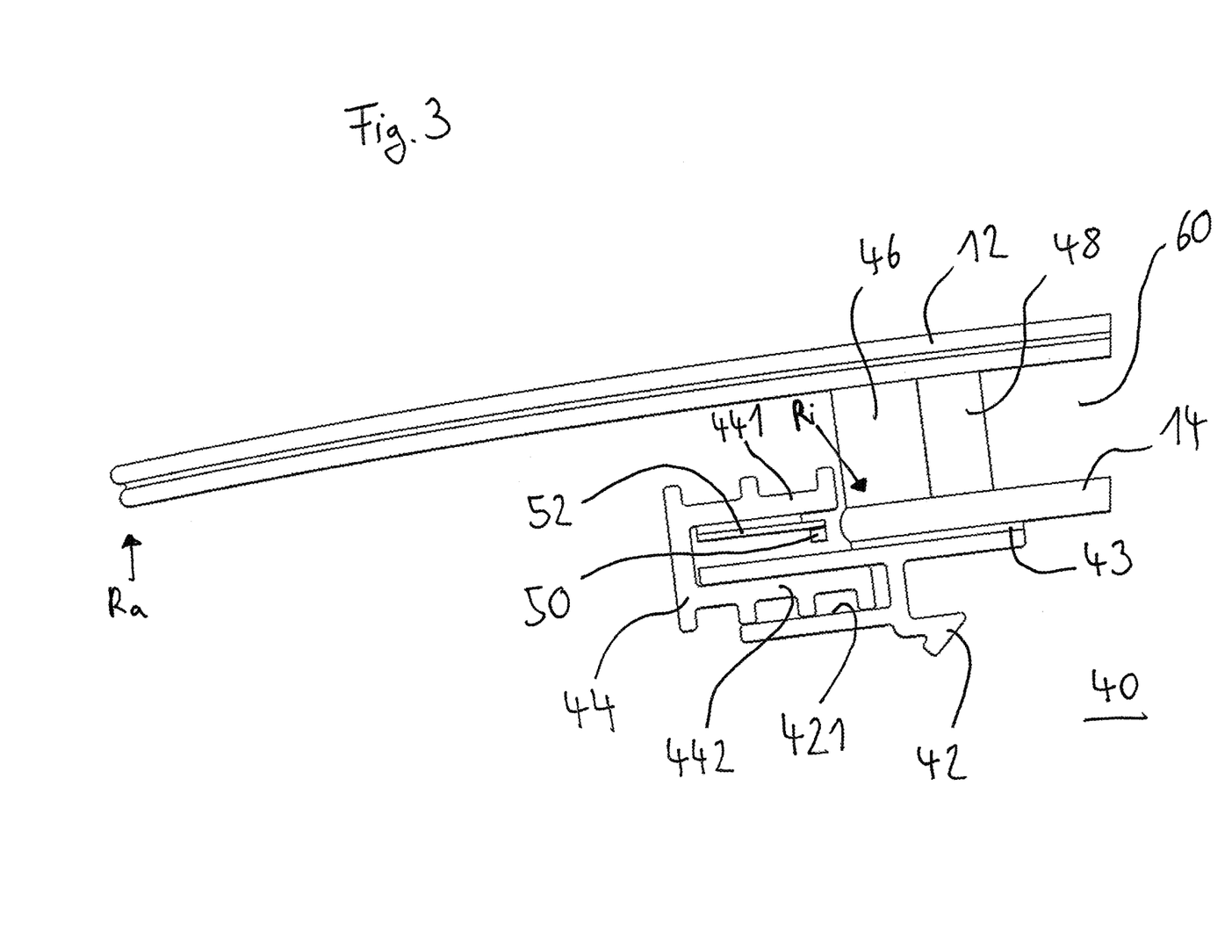
FIG. 3 shows a schematic illustration of the glazing device according to the invention in a cross section in the vehicle transverse direction according to a first embodiment of the invention.

FIG. 3 shows a schematic illustration of the glazing device 10 according to the invention in a cross section in the vehicle transverse direction according to a first embodiment of the invention.

In this embodiment, the carrier profile component 40 is attached exclusively to the inner glass element 14 and therefore has no direct attachment to the outer glass element 12.

For this purpose, the carrier profile component 40 has a first profile 42 and a second profile 44. The first profile 42 is attached to the inner glass element 40, for example via an adhesive bond 43. In the case illustrated, the first profile 42 therefore serves as a holder for the fixed roof lining 22 and is correspondingly formed with a plug-in or latching connection or suspension 20.

The second profile 44 is U-shaped in cross section and has two profile legs 441, 442. The second profile 44 firstly holds the lighting device 50 and is secondly connected to the first profile 42 by a form fit and/or force fit, by the one freestanding profile leg 441 of the second profile 44 holding the lighting device 50 laterally on the edge section Ri of the inner glass element 14 and by the other profile leg 442 being connected exclusively to the first profile 42, for example via a nondestructively detachable plug-in or latching connection. In particular, the other profile leg 442 is plugged into a groove 421 of the first profile 42.

In this embodiment, the second profile 44 holds the lighting device 50 in the form of a plurality of side LEDs, via which light can be coupled laterally into a lateral incident surface of the inner glass element 14. The side LEDs are contacted by a printed circuit board 52, which is arranged substantially parallel to the flat inner glass element 14 or a main surface of the inner glass element 14. In order to permit the most efficient coupling of light into the inner glass element 14, the second profile 44 is designed in the form of a light-shielding or light-reflecting bezel or covering.

As also illustrated in FIG. 3 and mentioned above, the outer glass element 12 and the inner glass element 14 form multipane insulating glass (MIG), of which the cavity 60 formed is defined firstly via a plurality of spacers 48 or a peripheral spacer 48 and secondly sealed off in a fluid-tight manner via a peripheral seal element or a peripheral seal 46 in the form of a PU injection molded element. This can be a two-component PU overmolding, produced by a high-pressure process with an appropriate mold. Alternatively, a one-component PU adhesive bond as a PU injection molded element, produced in a low-pressure process with a nozzle, robot, CNC control, can be considered.

In the case illustrated, the outer glass element 12 is formed as composite safety glass (VSG), while the inner glass element 14 is formed by single-pane safety glass (ESG). Preferably, the spacers 48 define a sufficiently large spacing in order, for example, to be able to provide the roller blind device 16-19 between the inner glass element 14 and the outer glass element 12.

Figure 4:
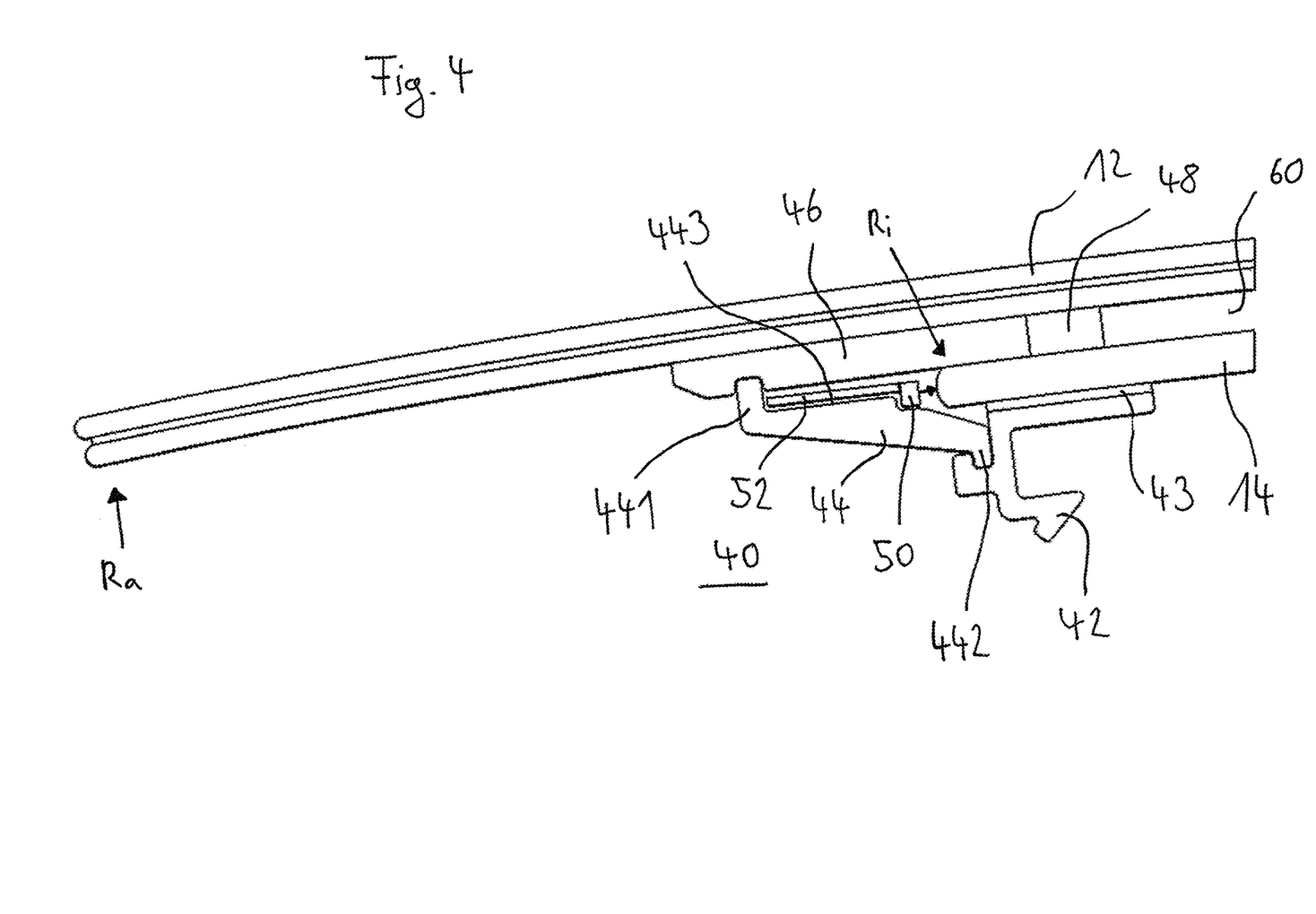
FIG. 4 shows a schematic illustration of the glazing device according to the invention in a cross section in the vehicle transverse direction according to a second embodiment of the invention.

FIG. 4 shows a schematic illustration of the glazing device 10 according to the invention in a cross section in the vehicle transverse direction according to a second embodiment of the invention. In the description of this embodiment, only the differences from the first embodiment will be discussed in order to avoid repetitions, the same or similar components being designated by the same designations.

In the case illustrated in FIG. 4, the carrier profile component 40 is attached both to the inner glass element 14 and to the outer glass element 12. In particular the one profile leg 441 of the second profile 44 is connected by a form fit and/or force fit to a supporting section attached to the outer glass element 12 on the inner side and spaced apart from the edge section Ra of the outer glass element 12, wherein the supporting section in this case is formed as an injection molded element and in addition performs the above-described sealing function for the multipane insulating glass, and therefore forms a sealing and supporting section 46. The other profile leg 442 of the second profile 44 is connected to the first profile 42, for example plugged into the first profile 42. A profile web 443 connecting the two profile legs 441, 442 thus holds the lighting device 50. Preferably, the connection of the second profile 44 to the first profile 42 and the sealing and supporting section 46 is formed as a clamped connection. In the case illustrated, it can be seen that the distance between the inner glass element 14 and the outer glass element 12 is chosen to be smaller than that distance in the first embodiment. A roller blind device 16-19 is not provided.

Figure 5:
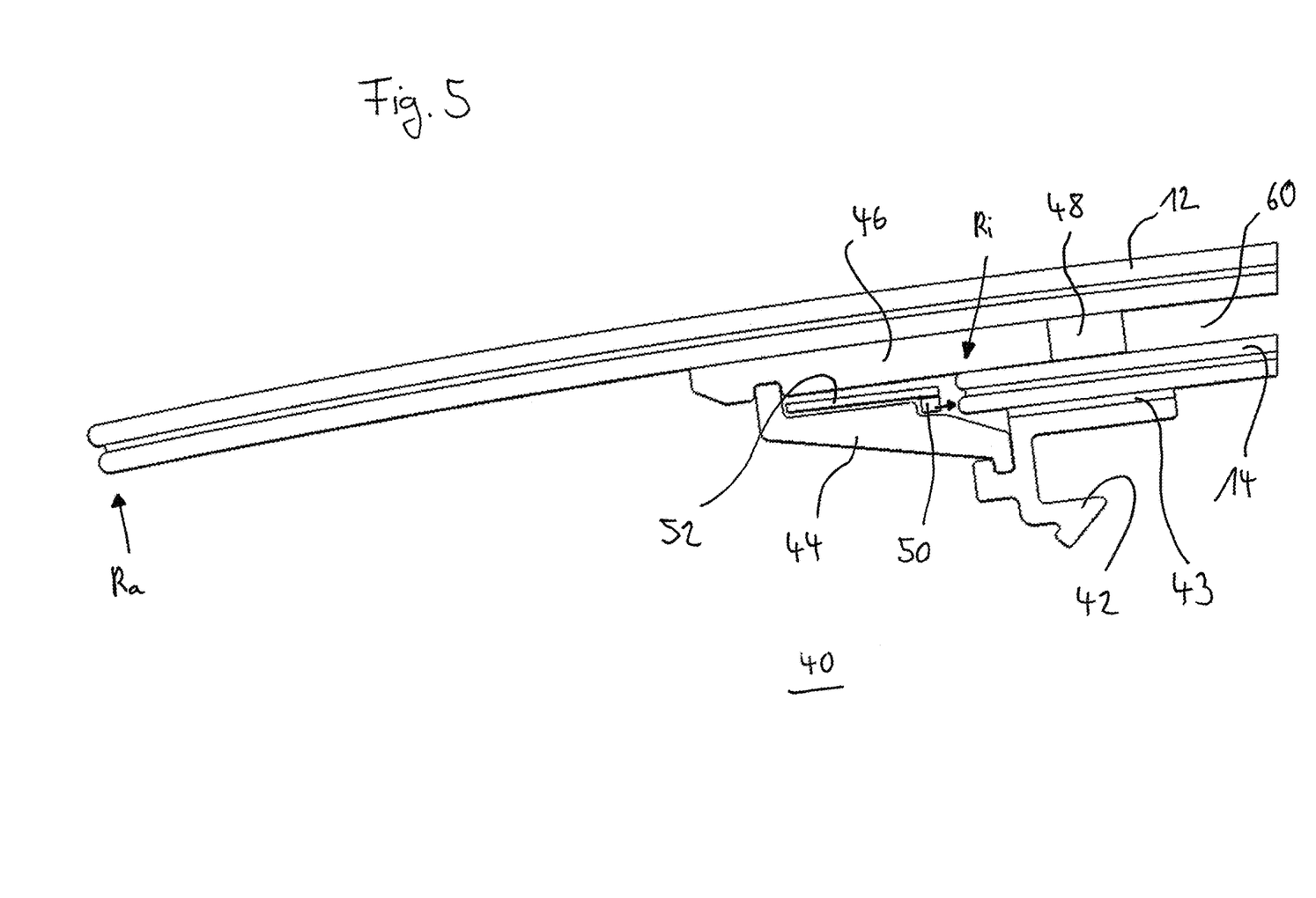
FIG. 5 shows a schematic illustration of the glazing device according to the invention in a cross section in the vehicle transverse direction according to a third embodiment of the invention.

FIG. 5 shows a schematic illustration of the glazing device 40 according to the invention in a cross section in the vehicle transverse direction according to a third embodiment of the invention. In the description of this embodiment, only the differences from the second embodiment will be discussed in order to avoid repetitions, the same or similar components being designated by the same designations. In this embodiment, the outer glass element 12 and the inner glass element 14 are formed as composite safety glass (VSG). As also illustrated schematically in FIG. 5, in the inner glass element 14 formed as a composite safety glass, the light is coupled into a lower pane of the glass composite, a transparent print which has reflective or light output structures being provided on the upper side of the lower pane. These reflect light coupled into the lower pane into the vehicle interior.

Figure 6:
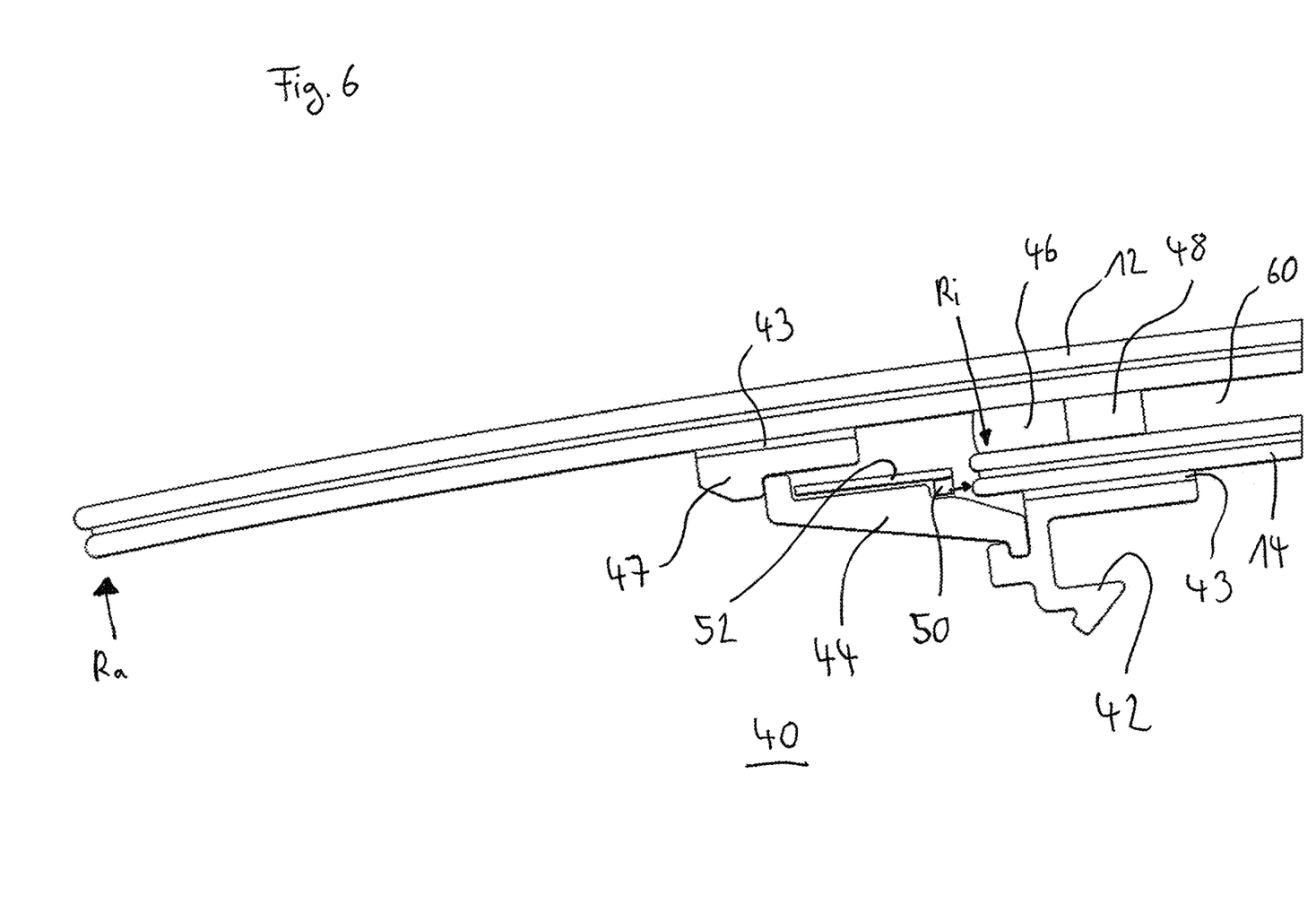
FIG. 6 shows a schematic illustration of the glazing device according to the invention in a cross section in the vehicle transverse direction according to a fourth embodiment of the invention.

FIG. 6 shows a schematic illustration of the glazing device 10 according to the invention in a cross section in the vehicle transverse direction according to a fourth embodiment of the invention. In the description of this embodiment, only the differences from the third embodiment will be discussed in order to avoid repetitions, the same or similar components being designated by the same designations.

In this embodiment, a supporting section 47 is formed separately from a seal 46 for the insulating glass. For example, the supporting section 47 is attached on the inside to the lower surface of the outer glass element 12 via an adhesive bond 43 at a certain distance from the edge section Ri of the inner glass element 14. In this embodiment, the seal 46 is preferably formed by a one-component PU adhesive bond.

Figure 7:
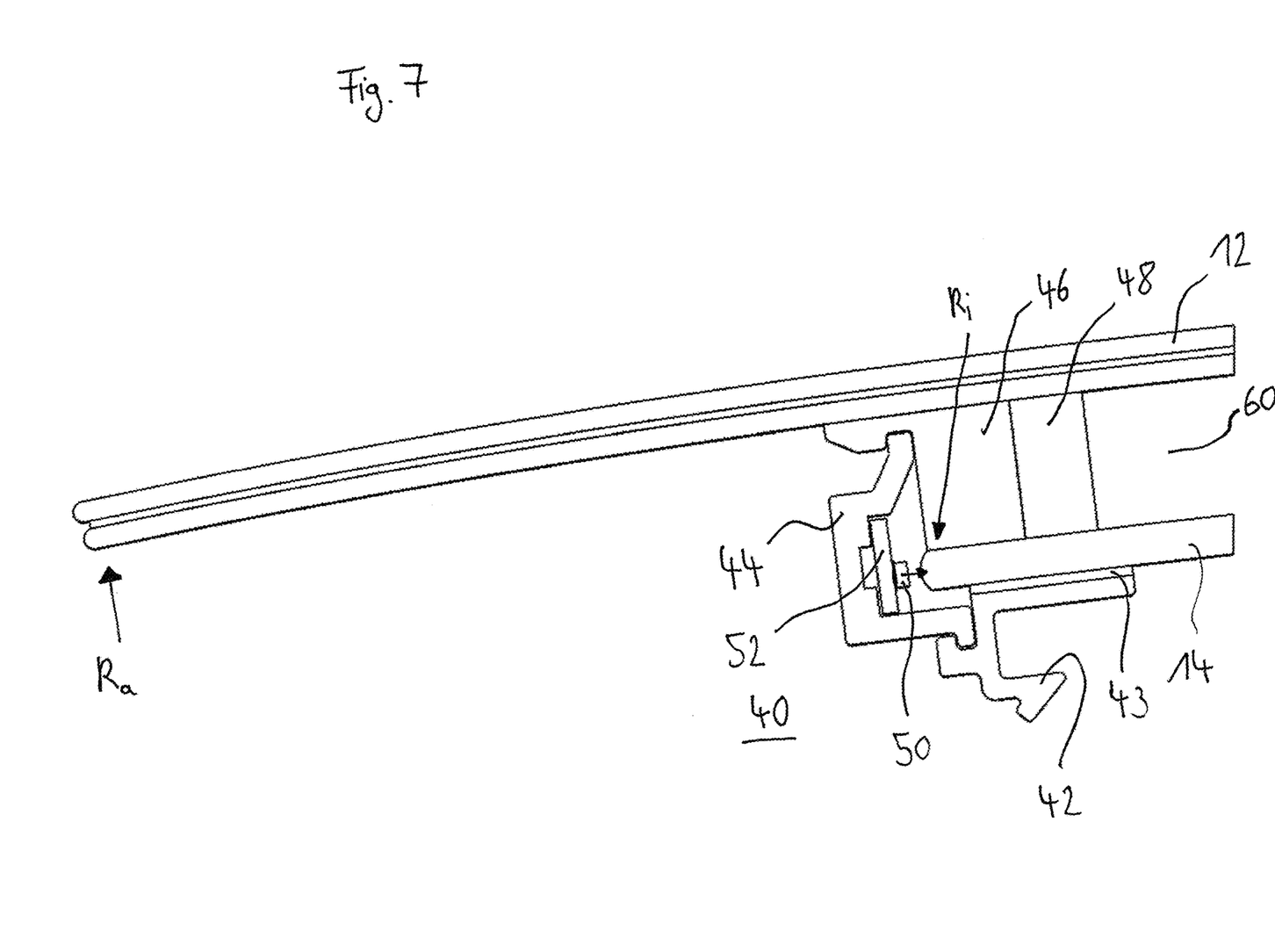
FIG. 7 shows a schematic illustration of the glazing device according to the invention in a cross section in the vehicle transverse direction according to a fifth embodiment of the invention.

FIG. 7 shows a schematic illustration of the glazing device 10 according to the invention in a cross section in the vehicle transverse direction according to a fifth embodiment of the invention. In the description of this embodiment, only the differences from the third embodiment will be discussed in order to avoid repetitions, the same or similar components being designated by the same designations.

In this embodiment, the carrier profile component 40, in particular the second profile 44, holds the lighting device 50 in the form of a plurality of top LEDs, wherein the printed circuit board 52 contacted by the top LEDs is arranged substantially perpendicular to the inner glass element 14, and the second profile 44 is designed in the form of a bezel. Preferably, the spacers 48 define a sufficiently large distance in order, for example, to be able to provide the roller blind device 16-19 between the inner glass element 14 and the outer glass element 12.

Figure 8:
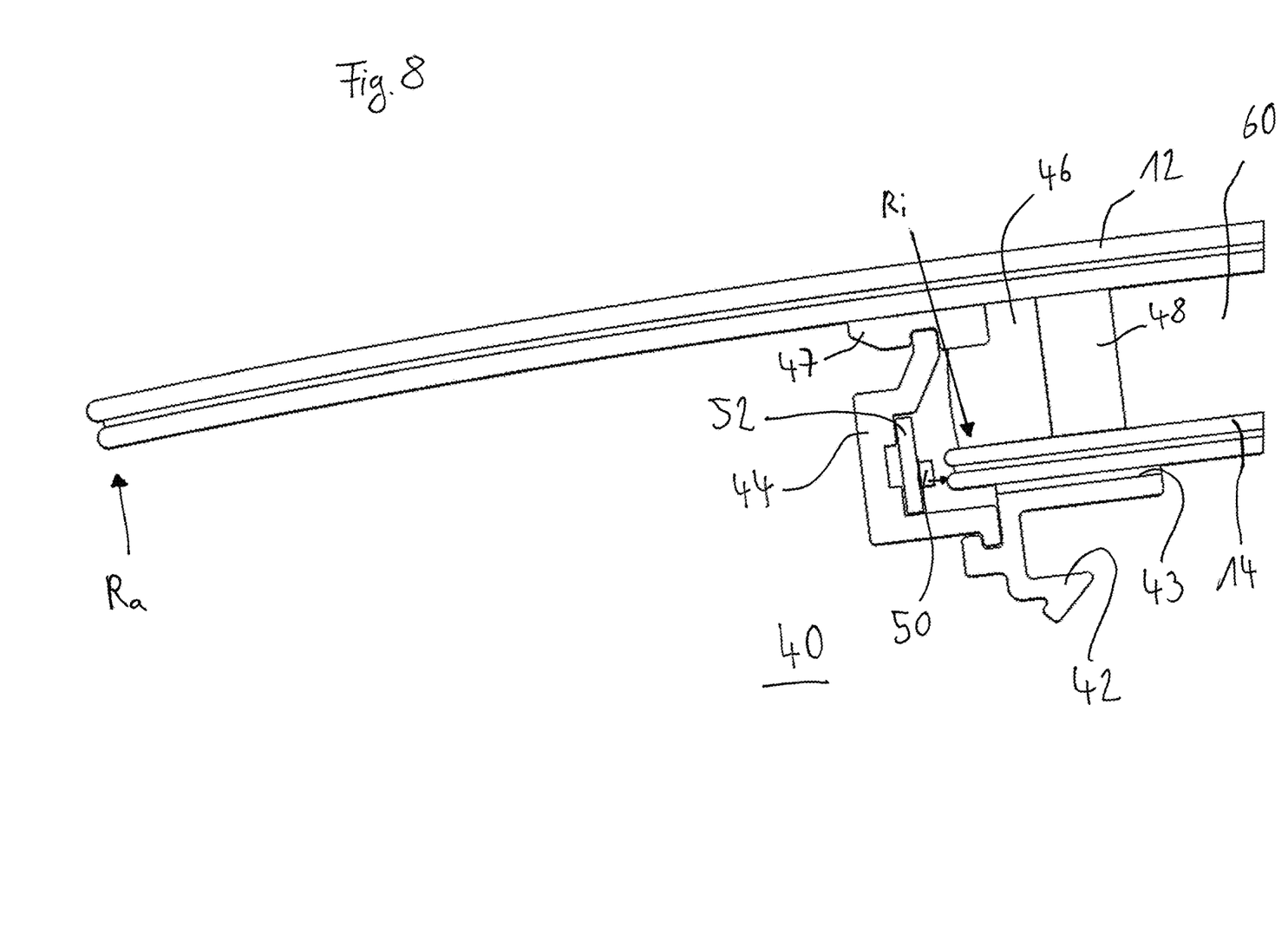
FIG. 8 shows a schematic illustration of the glazing device according to the invention in a cross section in the vehicle transverse direction according to a sixth embodiment of the invention.

FIG. 8 shows a schematic illustration of the glazing device 10 according to the invention in a cross section in the vehicle transverse direction according to a sixth embodiment of the invention. In the description of this embodiment, only the differences from the fifth element will be discussed in order to avoid repetitions, the same or similar components being designated by the same designations. In this embodiment, the outer glass element 12 and the inner glass element 14 are formed as composite safety glass (VSG), and the supporting section 47, for example foamed on or molded on, and the seal 46 are formed as separate elements but rest on each other. In this case, a one-component PU adhesive bond is preferably used for the seal 46.

A possible assembly or a possible mounting of the glazing device according to the invention is configured as follows:

Firstly, the printed circuit board 52 (PCB) with the contacted lighting device 50 in the form of one or more side LEDs, for example in the case of FIG. 3, is pre-mounted on the second profile 44 in the form of a bezel or a covering. Of course, the printed circuit board 52 can also be contacted by one or more top LEDs, as is the case, for example, in FIG. 7 or 8.

The lighting subassembly, namely the second profile 44 together with printed circuit board 52 and LEDs, is connected to the first profile 42, which provides the suspension for the roof lining 22. The first profile 42 is then attached to the underside of the inner glass element 14 or had already been attached there, for example in the case of FIG. 4.

In the cases of FIGS. 4 to 8, the second profile 44 is additionally attached to a supporting section 47 on the underside of the outer glass element 12 and therefore clamped in between the supporting section 47 and the first profile 42. The supporting section 47 can be formed as a two-component PU overmolding or alternatively as a one-component PU adhesive bond and can additionally function as a seal, accordingly as a sealing and supporting section 46 (FIGS. 4-5, 7) for the insulating glass, or can be provided as a separate component in relation to a seal 46 (FIGS. 6 and 8).

The features of the invention disclosed in the above description, in the drawings and in the claims may be essential for the implementation of the invention, both individually and in any desired combination.

LIST OF DESIGNATIONS

10 Glazing device
12 Outer glass element (of the glazing unit)
14 Inner glass element (of the glazing unit)
16 Winding shaft (of the roller blind device)
17 Drive (of the roller blind device)
18 Roller blind cable guide (of the roller blind device)
19 Tension rod (of the roller blind device)
20 Suspension for roof lining
22 Roof lining
30 Sealing lip
32 Plastic foaming or overmolding
34 Vehicle roof frame
36 Adhesive bond
40 Carrier profile component
42 First profile
43 Adhesive bond
44 Second profile
46 Sealing and possibly supporting section
47 Supporting section
48 Spacer
50 Lighting device
52 Printed circuit board
60 Cavity
100 Vehicle
441 Profile leg
442 Profile leg
443 Profile web
421 Groove
K Outer body skin
O Opening
Ra Edge section of the outer glass element
Ri Edge section of the inner glass element

The invention claimed is:

1. A glazing device for a vehicle having an illuminated glazing unit, by means of which an opening in an outer body skin of the vehicle is at least partly closed,
   wherein the glazing unit has a flat outer glass element at least partly forming or continuing the outer body skin, and a flat inner glass element arranged on the inside at a predetermined distance from the outer glass element,
   wherein a multi-part elongated carrier profile component is arranged on an edge section of the inner glass element and holds a lighting device such that the lighting device couples light laterally into the inner glass element, wherein
   the carrier profile component is attached exclusively to the inner glass element, or is attached both to the inner glass element and to the outer glass element,
   wherein the carrier profile component is at least partly designed as a holder for a fixed roof lining or a displaceable sliding roof lining or an inner lining of the vehicle and is configured to hold the fixed roof lining or the displaceable sliding roof lining or the inner lining, at least in some sections, and wherein the carrier profile component comprises a first profile and a second profile, wherein the first profile is attached to the inner glass element and forms the holder for the fixed roof lining or the displaceable sliding roof lining or the inner lining, while the second profile is connected to the first profile by a form fit and/or force fit and holds the lighting device laterally on the edge section of the inner glass element.

2. The glazing device as claimed in claim 1, wherein the outer glass element covers the inner glass element or projects laterally beyond the inner glass element in such a way that an edge section of the outer glass element can be attached to a vehicle roof frame and is spaced apart from the edge section of the inner glass element.

3. The glazing device as claimed in claim 1, wherein the second profile is formed with at least two profile legs, on one freestanding profile leg of which the lighting device is held, and of which the other profile leg is connected to the first profile.

4. The glazing device as claimed in claim 1, wherein the form-fitting and/or force-fitting connection of the second profile to the first profile is a nondestructively detachable plug-in connection or latching connection.

5. The glazing device as claimed in claim 1, wherein one profile leg of the second profile is connected by a form fit and/or force fit to a supporting section attached to the outer glass element on the inner side and spaced apart from the edge section of the outer glass element, and its other profile leg is connected to the first profile.

6. The glazing device as claimed in claim 5, wherein the connection of the second profile to the first profile and the supporting section is a clamped connection.

7. The glazing device as claimed in claim 5, wherein the one profile leg is in the form of an injection molded element.

8. The glazing device as claimed in claim 1, wherein the outer glass element and the inner glass element form multipane insulating glass, so that a cavity formed between the outer glass element and the inner glass element is closed in a fluid-tight manner, wherein a vacuum or a positive pressure prevails in the cavity.

9. The glazing device as claimed in claim 8, wherein the outer glass element and the inner glass element are held at a distance from each other via one or more spacers to form the cavity and/or the cavity is sealed off in a fluid-tight manner via a seal element.

10. The glazing device as claimed in claim 9, wherein the seal element is designed in the form of a PU injection molded element and/or is formed by the supporting section.

11. The glazing device as claimed in claim 1, wherein a roller blind device, via which the transparency of the glazing unit can be regulated by means of a roller blind web, is arranged between the outer glass element and the inner glass element.

12. The glazing device as claimed claim 1, wherein the carrier profile component holds the lighting device in the form of one or more side LEDs or one or more top LEDs, in such a way that light from the lighting device can be coupled laterally into the inner glass element, in particular into a lateral incident surface of the glass element.

13. The glazing device as claimed in claim 1, wherein the lighting device is formed by one or more side LEDs, which is/are contacted by one or more printed circuit boards, which is/are arranged substantially parallel to the inner glass element, or is formed by one or more top LEDs, which is/are contacted by one or more printed circuit boards, which is/are arranged substantially perpendicular to the inner glass element, wherein the one or more printed circuit boards is/are held by the second profile in the form of a bezel or covering.

14. The glazing device as claimed in claim 1, wherein the outer glass element and/or the inner glass element is/are formed by single-pane safety glass (ESG) or composite safety glass (VSG).

15. The glazing device as claimed in claim 1, wherein the carrier profile component forms a covering which covers the lighting device in the lateral area of the inner glass element.

16. A vehicle, in particular a motor or rail vehicle, having a vehicle roof, wherein the vehicle roof has an opening, which is at least partly closed by a glazing device as claimed in claim 1.

17. The vehicle as claimed in claim 16, wherein the vehicle is a motor or rail vehicle.

* * * * *